United States Patent [19]
Berk et al.

[11] Patent Number: 5,367,674
[45] Date of Patent: Nov. 22, 1994

[54] DATA STREAM OPTIMIZER UTILIZING DIFFERENCE CODING BETWEEN A CURRENT STATE BUFFER AND A NEXT STATE BUFFER

[75] Inventors: Jody E. Berk; James R. Coon; Paul R. Day; Peter J. Heyrman, all of Rochester; David L. Johnson, Pine Island, all of Minn.

[73] Assignee: International Business Machines Corporation, Armonk, N.Y.

[21] Appl. No.: 806,687

[22] Filed: Dec. 13, 1991

[51] Int. Cl.⁵ .......................... G06F 3/14; G06F 13/00
[52] U.S. Cl. .................................... 395/600; 395/700; 395/775; 341/87; 364/260.1; 364/260.2; 364/283.1; 364/DIG. 1
[58] Field of Search ............... 395/600, 425, 700, 775; 341/63, 76, 87; 358/261.1, 261.2, 261.3, 261.4; 348/415; 375/27; 370/104.1

[56] References Cited

U.S. PATENT DOCUMENTS

| | | | |
|---|---|---|---|
| 3,553,362 | 1/1971 | Mounts | 358/136 |
| 3,783,187 | 1/1974 | Kusama et al. | 358/261.4 |
| 3,925,780 | 12/1975 | Van Voorhis | 341/63 |
| 4,145,686 | 3/1979 | McMurray et al. | 341/87 |
| 4,168,513 | 9/1979 | Hains et al. | 358/261.2 |
| 4,207,599 | 6/1980 | Murayama et al. | 341/63 |
| 4,418,409 | 11/1983 | Queen | 370/95.3 |
| 4,646,261 | 2/1987 | Ng | 364/900 |
| 4,750,137 | 6/1988 | Harper et al. | 364/514 |
| 4,837,679 | 6/1989 | Wiles, Jr. et al. | 364/200 |
| 4,845,662 | 7/1989 | Shigenori et al. | 395/425 |
| 4,937,739 | 6/1990 | Ernst et al. | 364/200 |
| 4,965,754 | 10/1990 | Stansfield | 364/526 |
| 5,005,137 | 4/1991 | Ernst | 364/514 |
| 5,046,025 | 9/1991 | Harper et al. | 395/131 |
| 5,122,949 | 1/1992 | Harper et al. | 395/109 |
| 5,164,819 | 11/1992 | Music | 348/240 |
| 5,179,711 | 1/1993 | Vreeland | 395/775 |
| 5,245,441 | 4/1993 | Ruben | 358/426 |

OTHER PUBLICATIONS

Data Communications Series 3270 Superoptimizer TM ICICS Version 2.0, BMC Software, Jan. 30, 1989.
Application System/400 Communications Performance, Dave Johnson, Spring Common 1991.

*Primary Examiner*—Thomas C. Lee
*Assistant Examiner*—Paul R. Lintz
*Attorney, Agent, or Firm*—Steven W. Roth

[57] ABSTRACT

The disclosed data stream optimization process is containing two logical entities, the first being the pre-comparison optimizer component and the second being the comparison component. The pre-comparison optimizer component performs two discrete tasks. First, the input data stream is written into a next state buffer. Second, the elimination of redundancies involves detecting and removing redundant screen attributes, since the terminal's execution time for processing a screen attribute is more than that required for a data character. The comparison component contains three distinct sub-components. First, non-data constructs such as commands and orders are optimized and placed in the outgoing data stream. Second, the screen image that is represented by the data stream is compared to the existing screen image to further reduce the outgoing data stream. This reduced version is further reduced when repeated characters and fields are replaced with repeat orders which take up less space within the outgoing data stream. Lastly, the reduced outgoing data stream is operated on by a post-optimizer sub-component. The post-optimizer sub-component will first determine whether repeated characters existing at the end of the outgoing data stream can be replaced a single repeat order. Then, the sub-component proceeds to remove any unnecessary cursor control orders. Upon completion, the fully optimized data stream is routed to the terminal or conversion facility.

11 Claims, 7 Drawing Sheets

Post-optimizer

DATA STREAM OPTIMIZER UTILIZING DIFFERENCE CODING BETWEEN A CURRENT STATE BUFFER AND A NEXT STATE BUFFER

FIELD OF THE INVENTION

The invention relates to the data processing field. More specifically, the invention relates to the optimization of outbound data streams in the interest of improving overall system performance.

BACKGROUND OF THE INVENTION

Modern day computer systems often service a significant number of end user devices. Since these end user devices, or terminals, represent an important element of user productivity, efforts are constantly under way to improve their ease of use. Perhaps the most significant measure of a device's "usability" is its response time. Though response time is often perceived to be a function of the end user device itself, the rapidity of response, or lack thereof, is typically a function of the host unit. Therefore, the information sent by the host unit is of particular importance. When discussing the information that is sent from a host unit to a terminal, the nomenclature used is that of a data stream. A data stream can be conceptualized as a "flow" of information. The information flow, usually quantified in bytes, is what a user sees on their terminal's display screen. Beyond the raw information that is to be transmitted to the terminal, specific data stream architectures typically involve commands and orders that facilitate positioning the information on the display screen and/or emphasizing the appearance of the information (e.g., color, highlighting, etc.). Since the amount of information that is sent from the host unit to the terminal has a direct bearing on response time, computer designers are constantly looking for ways to reduce the necessary information flow. One way to reduce the information sent to the terminal is to send only the information that does not already exist on the terminal's display. An example of this reduction technique is to compare the terminal's existing screen image to the next screen image and route only the differences. Another similar technique is to monitor the terminal's existing image and then route only the updates.

While these optimization techniques have reduced response time somewhat, the amount of unnecessary information that is routed to the terminal remains significant. There is time and productivity lost with every unnecessary byte of information that flows to the terminal. This problem becomes even more acute when one considers computer systems that support non-native devices (i.e., terminal devices that were originally designed to operate on a different system). One example is the support of IBM 3270 terminal devices by computer systems that use the IBM 5250 data stream protocol. When a 3270 device is connected to a 5250 system, each and every instruction (e.g., a non-data entity) of the 5250 data stream must be translated into an instruction that can be understood by the 3270 device. In some cases, one 5250 command translates into several 3270 commands. This has the drastic result of increasing response time rather than decreasing response time.

SUMMARY OF THE INVENTION

It is a principal object of this invention to provide for more effective and efficient optimization of a computer data stream.

It is another object of this invention to provide for more effective and efficient optimization of the IBM 5250 data stream.

It is still another object of this invention to provide an enhanced method and apparatus for data stream comparison optimization.

These and other objects of this invention are accomplished by the data stream optimization mechanism disclosed herein.

In the generic sense, data streams are made up of commands, orders, screen attributes and data. Commands and orders are instructions sent to a terminal device. A command is an instruction which affects the display screen as a whole; whereas, an order is an instruction that affects only a specified portion of the display screen. While commands and orders are used to facilitate control of a terminal's display screen, screen attributes are used to control the appearance of specified instances of data (e.g., highlighting, underlining, color, etc.).

The commands, orders, screen attributes, and data of a particular data stream are interrogated by an optimization mechanism. The optimization mechanism will determine which bytes are not needed to refresh the terminal's display. The mechanism then routes only the essential bytes to the display. When non-native devices are involved, the optimized data stream is sent to a translation facility before being routed to the display.

The disclosed data stream optimization process is most easily conceptualized as containing two logical entities, the first being the pre-comparison optimizer component and the second being the comparison component. The pre-comparison optimizer component performs two discrete tasks. First, the input data stream is written into a next state buffer. Second, certain redundancies within the data stream are eliminated. The elimination involves detecting and removing redundant screen attributes. Since the terminal's execution time for processing a screen attribute is more than that required for a data character, elimination of redundant screen attributes is of particular importance.

The comparison component contains three distinct sub-components. First, non-data constructs such as commands and orders are optimized and placed in the outgoing data stream. Second, the screen image that is represented by the data stream is compared to the existing screen image to further reduce the outgoing data stream. This reduced version is further reduced when repeated characters and fields are replaced with repeat orders which take up less space within the outgoing data stream. Lastly, the reduced outgoing data stream is operated on by a post-optimizer sub-component. The post-optimizer sub-component will first determine whether repeated characters existing at the end of the outgoing data stream can be replaced by a single repeat order. Then, the sub-component will proceed to remove any unnecessary cursor control orders. Upon completion, the fully optimized data stream is routed to the terminal or conversion facility.

DESCRIPTION OF THE PREFERRED EMBODIMENT

Figure 1:
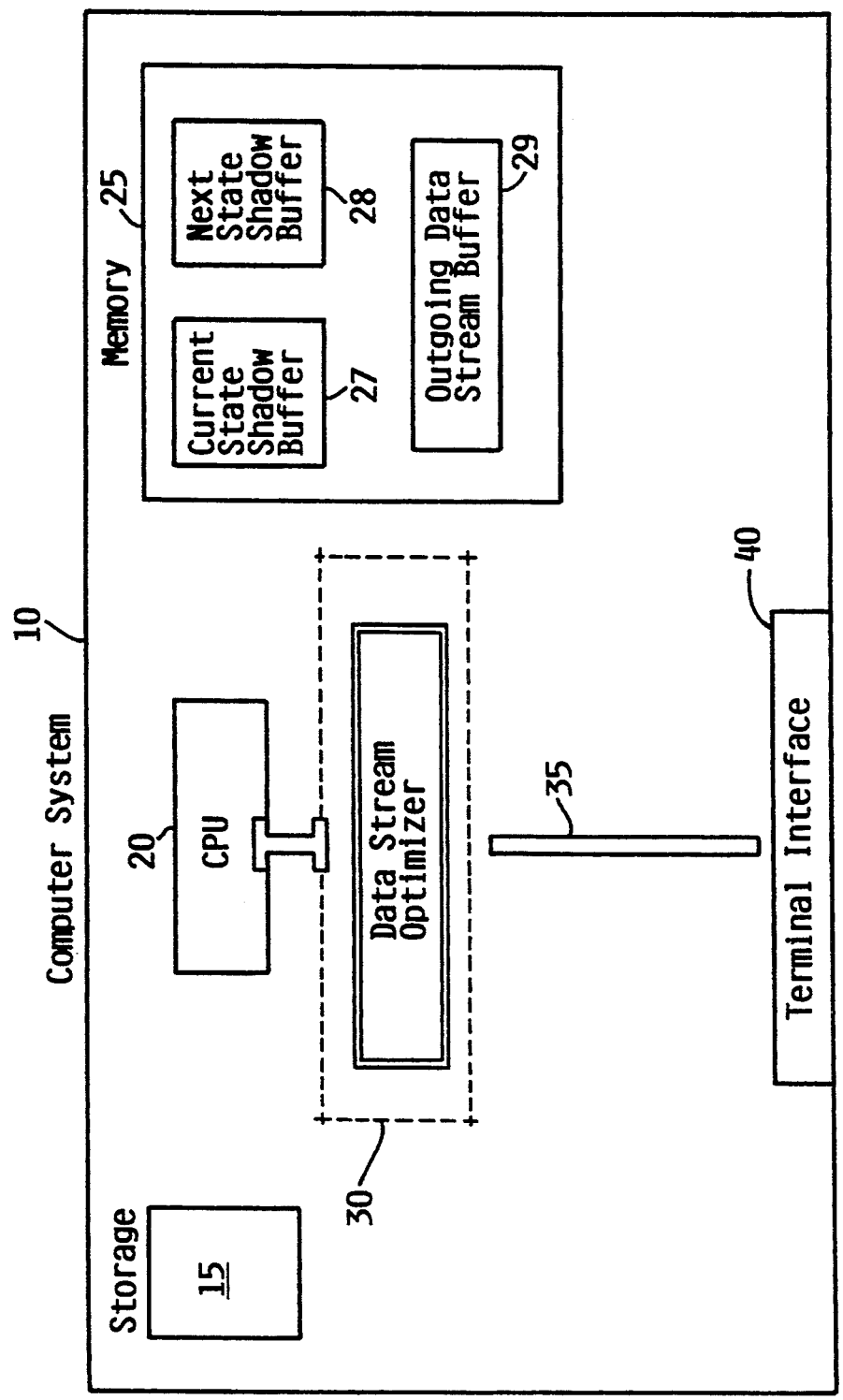
FIG. 1 shows the computer system of the invention.

FIG. 1 shows a block diagram of the computer system of the preferred embodiment. In the preferred embodiment, computer system 10 is an Application System/400 midrange computer and data stream 35 is an optimized IBM 5250 data steam. However, the present invention can operate on any computer system that generates a data stream that includes commands, orders, data characters or the equivalent. One example is Digital Equipment Corporation's VAX 4500.

Referring still to FIG. 1, computer system 10 contains storage 15, CPU 20, memory 25, and terminal interface 40. Memory 25 further includes current state shadow buffer 27, next state shadow buffer 28, and outgoing data stream buffer 29. Current state shadow buffer 27 and next state shadow buffer 28 are screen buffers. After data has been executed into these screen buffers, the screen buffers represent actual display screen images. Also contained within each of the screen buffers is a field format table which includes information about fields which exist in the particular screen buffer. Outgoing data stream buffer 29 is a data stream buffer. Data is written into this buffer to facilitate later transmission to the display screen. Although in the preferred embodiment Data Stream Optimizer 30 is part of CPU 20, suitably programmed as shown in the flow charts of FIGS. 3-7, it could just as easily be implemented as part of Terminal Interface 40 or as part of an entity separate from Computer System 10 (e.g., a communications controller).

Figure 2:
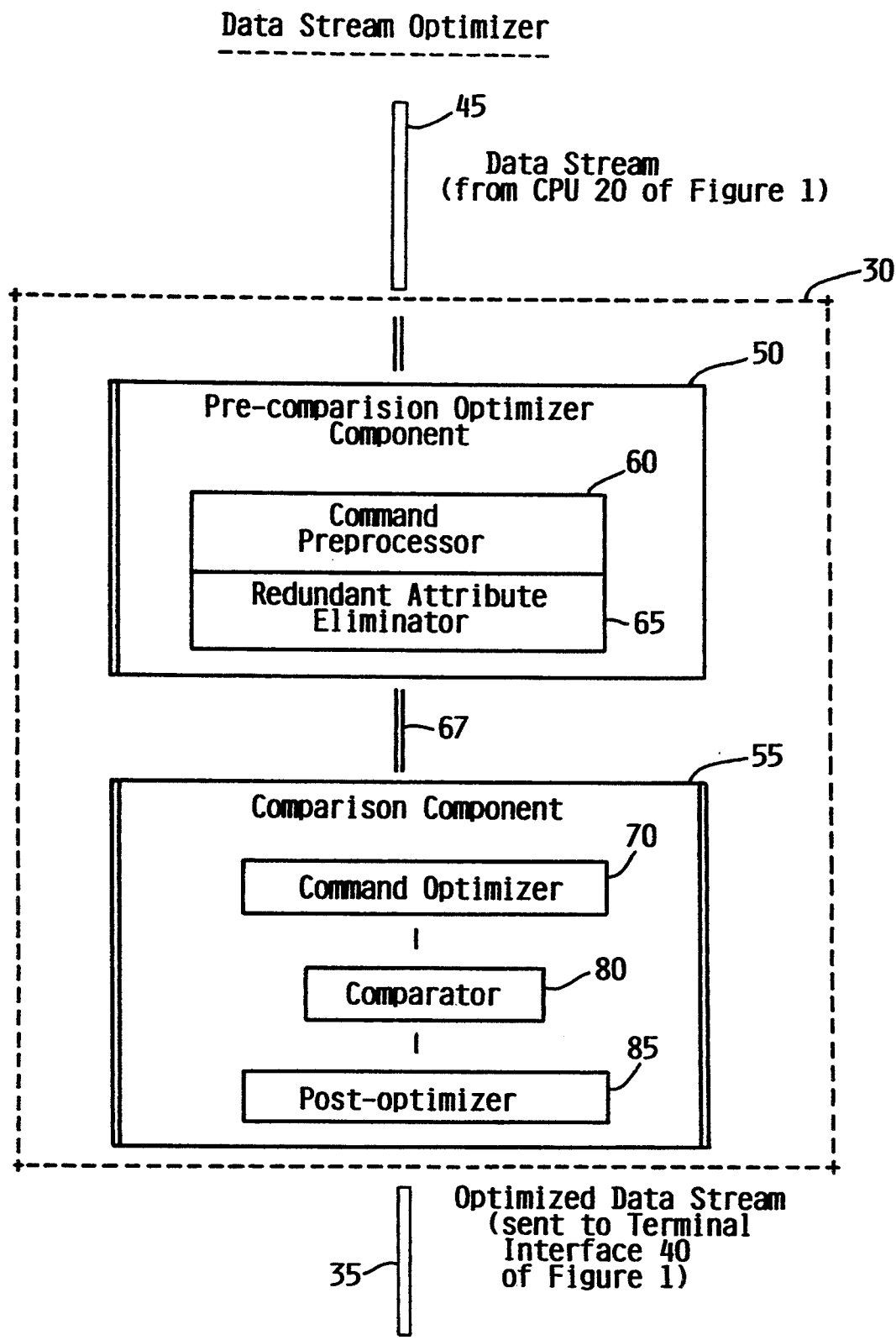
FIG. 2 shows the data stream optimizer and its two logical components, the pre-comparison component and the comparison component.

FIG. 2 shows the two logical components of data stream optimizer 30. Input data stream 45, originating in CPU 20 of FIG. 1, first encounters pre-comparison optimizer component 50 of data stream optimizer 30. Pre-comparison optimizer component 50 is itself made up of command preprocessor 60 and redundant attribute eliminator 65. In command preprocessor 60, input data stream 45 is first inspected for commands and orders. When 5250 data stream commands or orders are detected, the associated command or order type is recorded for later use in comparison component 55. Once input data stream 45 has been inspected for commands and orders, it is written into next state shadow buffer 28. After this process is complete, redundant attribute eliminator 65 of pre-comparison optimizer component 50 begins. It is here that unnecessary attributes are eliminated from the outgoing 5250 data stream. This will be explained in greater detail in the discussion associated with FIG. 4.

When pre-comparison optimizer component 50 completes its processing, command optimizer 70 of comparison component 55 uses the command and order type information recorded by command preprocessor 60 to further optimize the outgoing 5250 data stream. This optimizer includes combining several command. A Write-To-Display command is a command that instructs the terminal to write specified data to the display. Once command optimizer 70 is complete, comparator 80 further optimizes the outgoing 5250 data stream by comparing the images represented in next state shadow buffers 28 to current state shadow buffer 27. As discussed above, only changed information is placed into the outgoing 5250 data stream. As a final step, post-optimizer 85 is used to further reduce the outgoing 5250 data stream. The operation of post-optimizer 85 is explained in more detail in the discussion associated with FIG. 7. The fully reduced and optimized 5250 data stream is then routed to a terminal or conversion utility.

Figure 3:
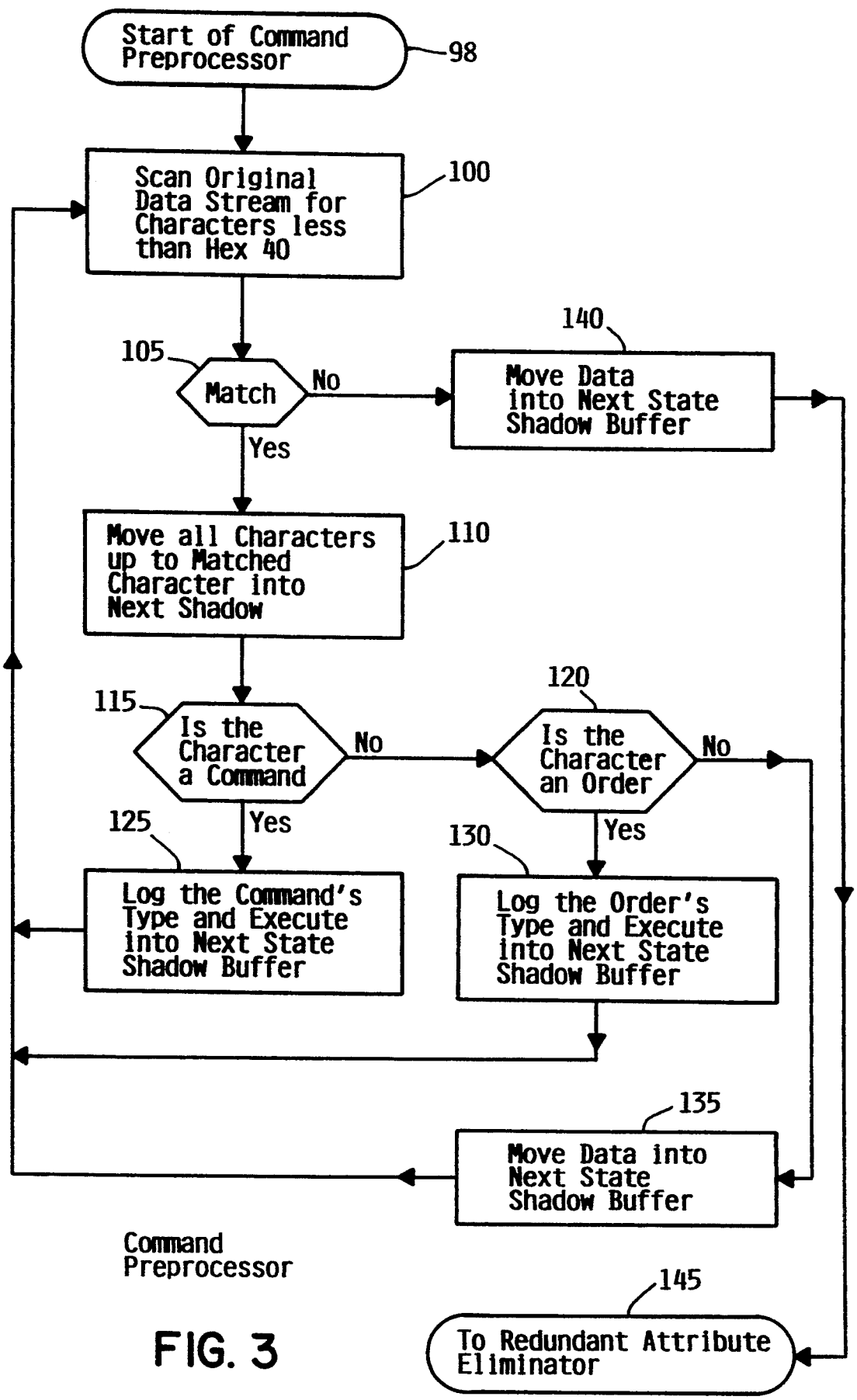
FIG. 3 shows the flow diagram of the command preprocessor portion of the pre-comparison optimizer component.
Figure 4:
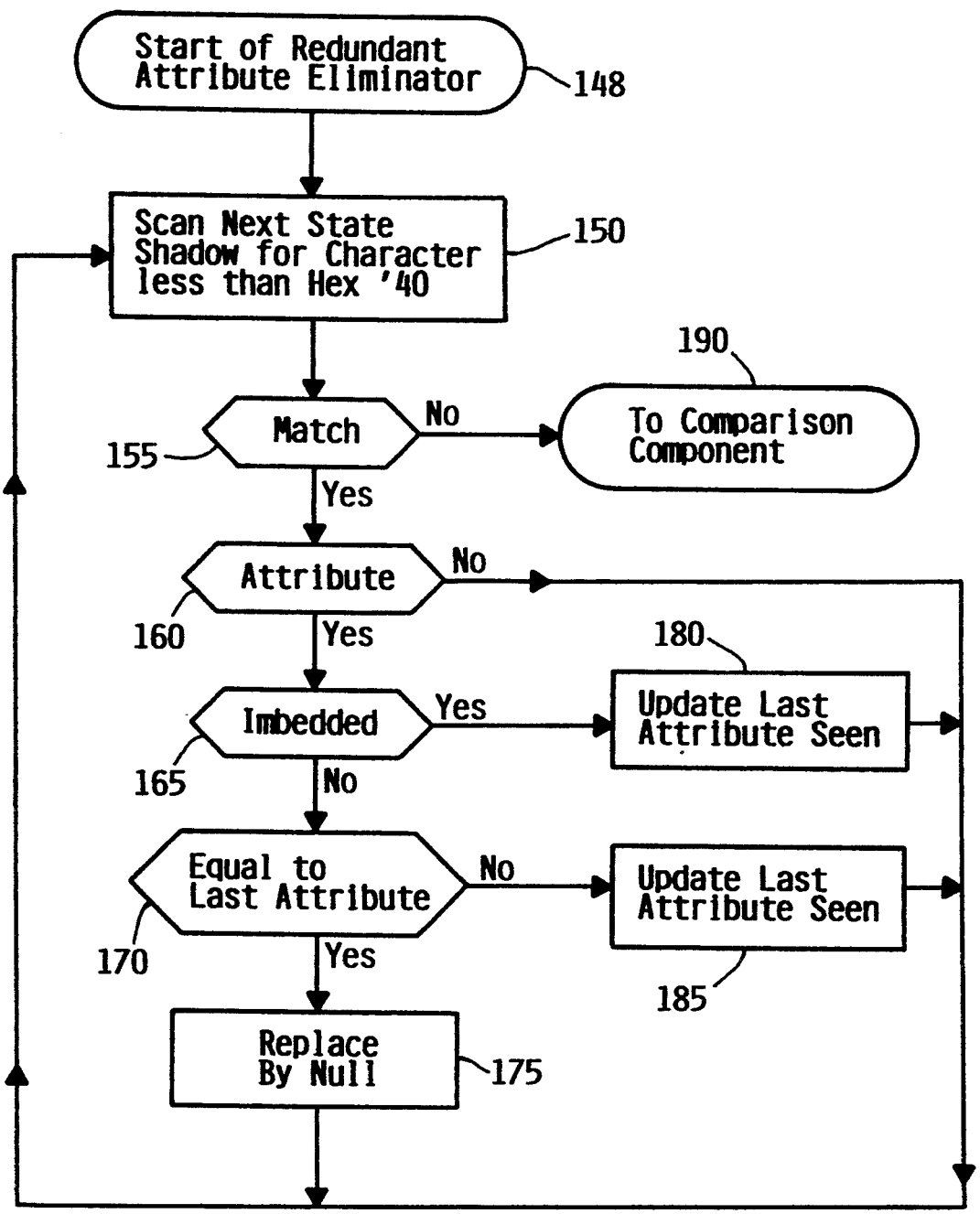
FIG. 4 shows the flow diagram of the redundant attribute eliminator portion of the pre-comparison optimizer component.

FIG. 3 shows a flow diagram of command preprocessor 60. Command preprocessor 60 begins by scanning input data stream 45 for characters that are less than Hex '40', block 100. This is because EBCDIC characters that are less than Hex '40' will generally be commands, orders, or screen attributes. If the scan does not reveal any characters that fit this description, command preprocessor 60 will write the original data stream into next state shadow buffer 28, block 140. Pre-comparison optimizer component 50 will then continue to redundant attribute eliminator 65 (described in connection with FIG. 4). If, however, a match is detected, command preprocessor 60 will write all the characters which preceded the trapped character into next state shadow buffer 28, block 110. At this point, command preprocessor 60 will determine whether the trapped character is a command or an order 115. If the character is a command, command preprocessor 60 logs the command's type and executes the command into next state shadow buffer 28, 125 (i.e., it updates the field format table or performs whatever other changes to the screen buffer as required by the commands or orders). Command preprocessor 60 then resumes scanning 100. If the trapped character is not a command, command preprocessor 60 will determine whether the character is an order. If the character is an order, it is handled in same manner as a command 130 (i.e., its type is logged and it is written into next state shadow buffer 28). If the character is neither an order nor a command, it is either a screen attribute or an unknown character. If it is one of the latter, command preprocessor 60 will write the character into next state shadow buffer 135. Eventually, the test of decision block 105 will fail and pre-comparison optimizer component 50 will continue with redundant attribute eliminator 65.

Redundant attribute eliminator 65 (FIG. 4) begins by scanning the characters of next state shadow buffer 28 for characters that have a value of less than Hex '40', block 150. In this step, redundant attribute eliminator 65 is looking for screen attributes to determine if they are redundant. An attribute is considered redundant if it is equal to a previous non-redundant attribute and the string of data between the two attributes is not interrupted by an input field. If none are found, redundant attribute eliminator 65 will discontinue processing. Processing of the outgoing data stream then continues with comparison component 55 (described in conjunction with FIGS. 5-7). If, however, a character with a value less than Hex '40' is detected, redundant attribute eliminator 65 will determine whether the trapped character is a screen attribute 160. If the trapped character is not a screen attribute, the scanning will continue 150. If redundant attribute eliminator 65 determines that a screen attribute has been located, it next asks whether the attribute is imbedded 165. An imbedded attribute is one that is contained in an input field of the 5250 data stream. Since input fields represent data areas that are modifiable by the user or an application program, the attributes that are contained therein are not considered redundant. Accordingly, screen attributes that are included within input fields are never eliminated. Nonetheless, redundant attribute eliminator 65 will update its "last attribute seen" variable to reflect that this attribute was the last attribute encountered 180. This is done because the last attribute seen variable is later used to determine whether the current attribute is redundant. If an attribute is not imbedded 165 and it is equal to the last attribute seen 170, it is deemed to be redundant, and accordingly, replaced by a null character 175. The replacement of redundant attributes with null characters does not reduce the size of the outgoing 5250 data stream. The benefits of the replacement occur when the 5250 data stream is later translated into another data stream that requires several bytes to represent a single 5250 attribute. Further, additional savings occur when terminals and controllers can process the null characters instead of screen attributes.

Figure 5:
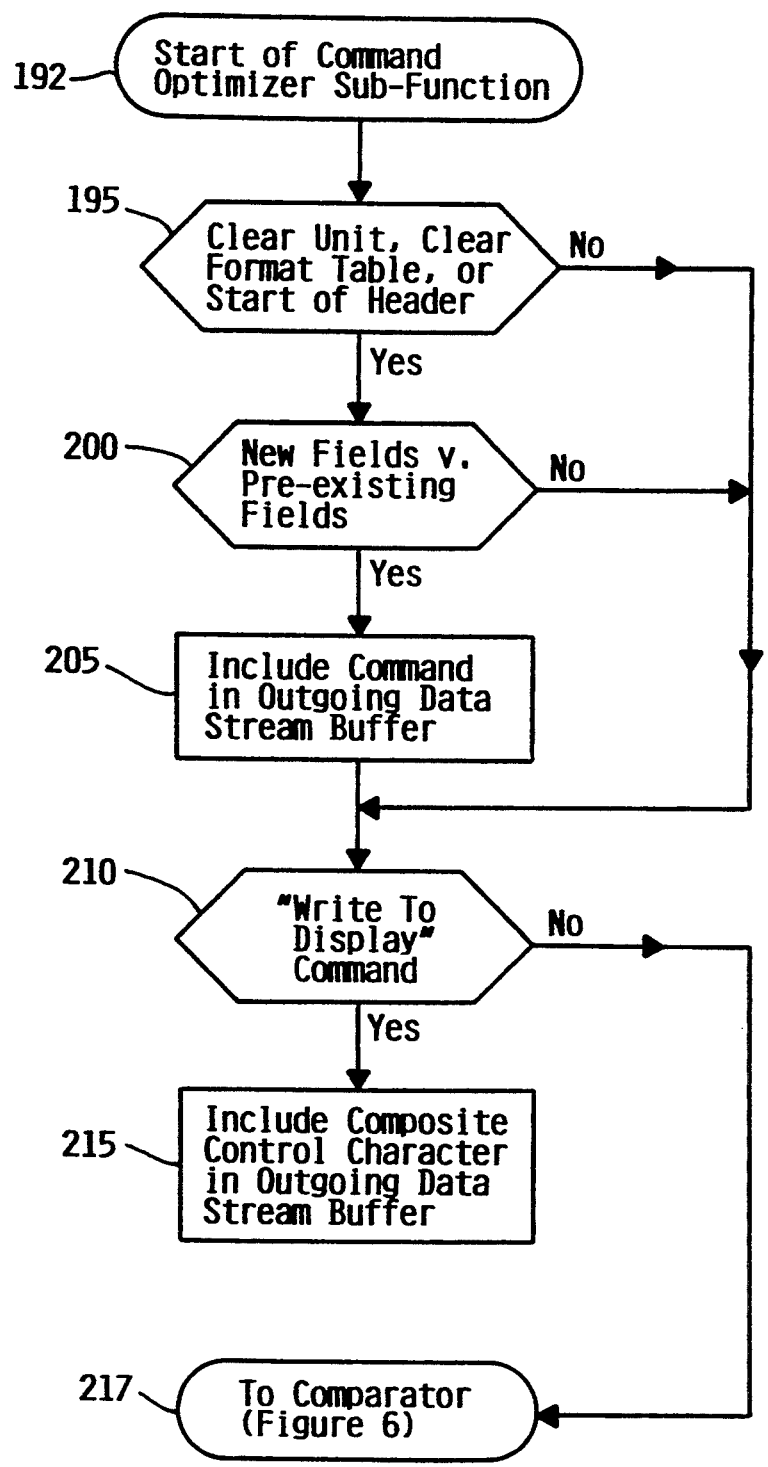
FIG. 5 shows the flow diagram of the command optimizer sub-component of the comparison component.

Referring now to optimizer sub-component 70 of comparison component 55 command, FIG. 5 shows that this sub-component is first interested in clear unit commands, clear format table commands, and start of header orders 195. Command optimizer 70 makes this determination by using the information logged by command preprocessor 60 (see the description of FIG. 3 above). If one of these commands or orders is detected, command optimizer 70 will determine whether the command or order represents a new or pre-existing field within the subject display's 5250 field format table 200. When a new field is involved, the command or order is included in the outgoing data stream 205. When a new field is not involved, the command or order is eliminated.

If instead of one of the above, a Write-To-Display command is detected, command optimizer 70 is able to create a single composite Write-To-Display command in which all Write-To-Display commands can be consolidated 215. This further reduces the size of the 5250 data stream. At this point, reduction of the 5250 data stream continues with the actual comparison of current state shadow buffer 27 and next state shadow buffer 28, block 217.

Figure 6:
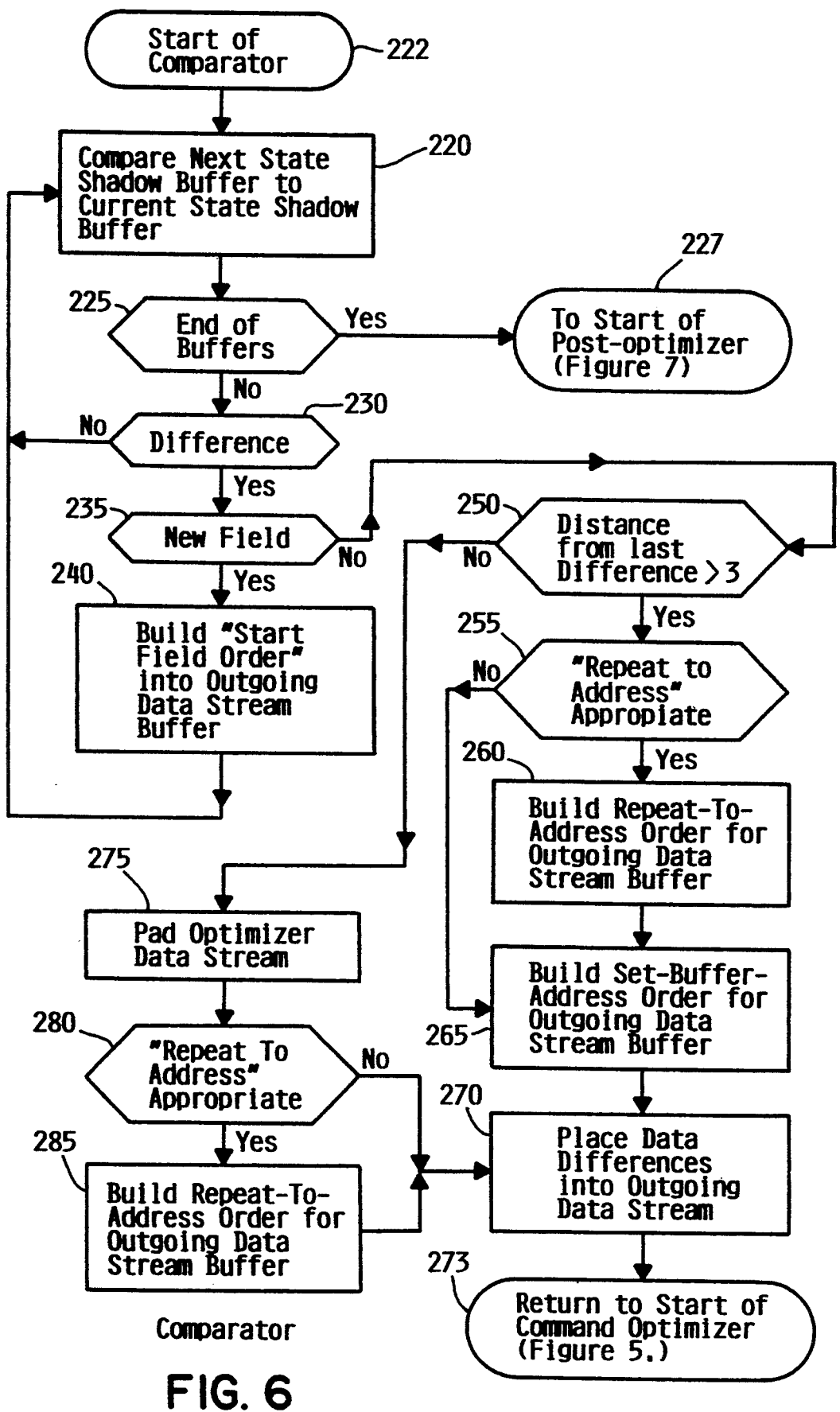
FIG. 6 shows the flow diagram of the comparator sub-component of the comparison component.

FIG. 6 shows how current state shadow buffer 27 and next state shadow buffer 28 are used to produce outgoing data stream buffer 29. Comparator 80 sequentially compares each character in current state shadow buffer 27 with its counterpart in next state shadow buffer 28, block 220. If in performing this comparison, comparator 80 determines that the buffers have reached an end 225, processing will continue with post-optimizer 85 of data stream optimizer 30. If the buffers have not reached an end and comparator 80 does not detect a difference between the two characters 230, the process will repeat 220. If a difference in characters is detected 230, comparator 80 will ask if the subject character is the first character of a Start-Field order 235. If the subject character is the first character of a Start-Field order within the field format table, a Start-Field order is built and included into outgoing data stream buffer 29, block 240. If the subject character is not the first character of a Start-Field order, but is instead a simple data character, comparator 80 determines whether the distance between the location of the subject character and the location of the previous difference is greater than three bytes 250. If the previous difference is located three bytes or less away, it is best to simply copy the intervening bytes from the current state shadow buffer 27, into the data stream buffer block 275. When the distance between locations is greater than three bytes, a Set-Buffer-Address command is used in lieu of the bytes from current state shadow buffer 27, block 265. A Set-Buffer-Address command is used to instruct the terminal to place a specified character at a specified location effectively skipping over the intervening unchanged characters. Although the IBM 5250 Set-Buffer-Address command is used, it will be recognized by those skilled in the art that typical data stream architectures include commands which provide the same or similar function.

Regardless of the distance between locations comparator 80 will next determine whether it is possible to compress the data stream through the use of a Repeat-To-Address order. An IBM 5250 Repeat-To-Address order is a four byte order that instructs a terminal to repeat a specified character up to and including a specified address. As with the Set-Buffer-Address command, it will be recognized by those skilled in the art that typical data stream implementations include an order or series of orders which perform the function of the IBM 5250 Repeat-To-Address order. Before comparator 80 places the subject character into outgoing data stream buffer 29, it will check to see if the subject character is different from the last entity that was placed in outgoing data stream buffer 29, blocks 255 and 280. If the subject character is the same as the last entity placed in outgoing data stream buffer 29 (i.e. the last entity is a data character with the same value), a Repeat-To-Address order is not appropriate. Similarly, a Repeat-To-Address order is inappropriate if a detected difference is due to a Set-Buffer-Address order (i.e. the last entity placed in outgoing data stream buffer 29 was a Set-Buffer-Address order). However, if it turns out that a difference is detected because the last entity placed into outgoing data stream buffer 29 was a different data character, a Repeat-To-Address order will be used if the previous five or more characters within outgoing data stream buffer 29 are repeated. Then, the subject character, with or without the associated orders and intervening characters is placed into outgoing data stream buffer 29, block 270. From here, the processes of command optimizer 70 and comparator 80 are repeated until end of buffers test 225 is satisfied.

Figure 7:
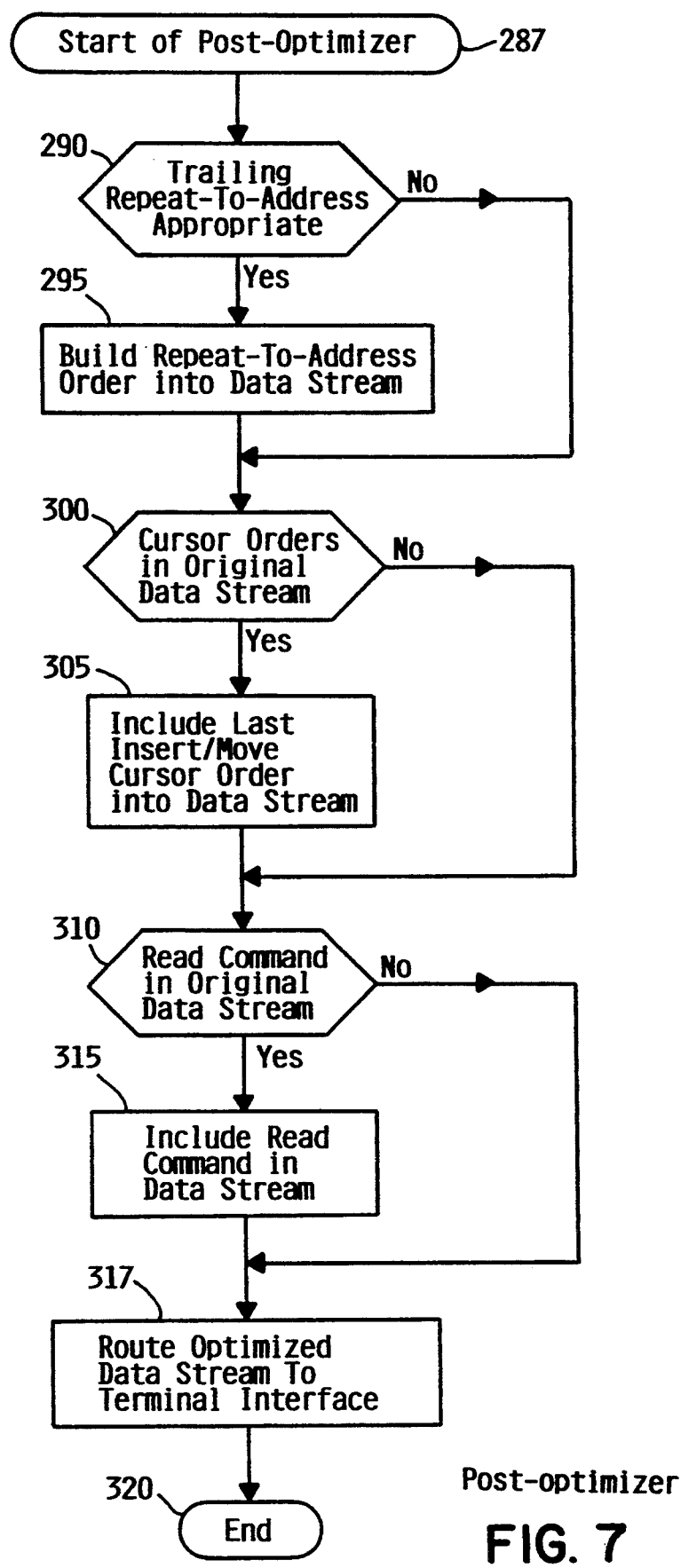
FIG. 7 shows the flow diagram of the post-optimizer sub-component of the comparison component.

FIG. 7 shows the flow diagram of post-optimizer 85. Since comparator 80 does not use a Repeat-To-Address order until it detects a difference in the characters of outgoing data stream buffer 29, it is possible that several characters were repeated as the buffers were exhausted. Therefore, post-optimizer 85 will first determine if a trailing Repeat-To-Address order is appropriate 290 (see the discussion associated with blocks 255 and 280), and if so, place one in outgoing data stream buffer 29, block 295. Post-optimizer 85 will next determine whether there are multiple cursor orders in outgoing data stream buffer 29, block 300. Since the user makes use of only the last cursor order, all other cursor orders are removed from outgoing data stream buffer 29, block 305.

Finally, post-optimizer 85 uses the information recorded by command preprocessor 60 to determine whether the original data stream contained a Read command. Since a Read command changes the terminal's mode from output to input, it must be placed at the end of the data stream. Hence, if a Read command is detected, it is inserted into the end of outgoing data stream buffer 29, block 315. After post-optimizer 85 has completed, the contents of outgoing data stream buffer 29 is a fully optimized data stream. Prior to terminating 320, optimized data stream 35 is routed to terminal interface 40, block 317.

Although a specific embodiment of the invention has been disclosed, it will be recognized by those skilled in the art that additional variations in form and detail may be made within the scope of the following claims.

What is claimed is:

1. A computer implemented method for optimizing a data stream, said method comprising the steps of:
   receiving said data stream into a next state buffer;
   comparing said next state buffer to a current state buffer to detect a first difference and a second difference between said next state buffer and said current state buffer;
   placing characters from said current state buffer into said outgoing data stream buffer when said first difference is less than N bytes away from said second difference, where N is a non-negative positive integer of value greater than one;
   using a Repeat-To-Address order in place of repeated characters within said outgoing data stream buffer whenever there are more than M of said repeated characters, where M is a non-negative positive integer of value greater than one;
   placing a Set-Buffer-Address order into said outgoing data stream buffer when said first difference is not a new field and said first difference is greater than P bytes away from a second difference, where P is a non-negative positive integer of value greater than one;
   outputting data in said outgoing data stream buffer to a terminal device.

2. A computer implemented method as in claim 1 wherein said outputting step comprising the steps of:
   creating an optimized data stream by replacing trailing repeated characters with a Repeat-To-Address order, said trailing repeat characters being of number greater than M;
   removing all cursor orders within said optimized data stream except a last cursor order; and
   outputting said optimized data stream to a terminal device.

3. A computer implemented method for optimizing the commands, orders, and data of a data stream, said method comprising the steps of:
   receiving said data stream into a next state buffer;
   removing any redundant screen attributes found within said next state buffer;
   comparing a current state buffer to said next state buffer to discern a first difference and a second difference between said current state buffer and said next state buffer, wherein said comparing step further comprises the steps of:
   a) placing characters from current state buffer into an outgoing data stream buffer when said first difference is less than N bytes away from said second difference, where N is a non-negative positive integer of value greater than one;
   b) using a Repeat-To-Address order in place of repeated characters within said outgoing data stream buffer whenever there are more than M of said repeated characters, where M is a non-negative positive integer of value greater than one;
   c) placing a Set-Buffer-Address order into said outgoing data stream buffer when said difference is not a new field and said difference is greater than P bytes away from a last difference, where P is a non-negative positive integer of value greater than one;
   forming an optimized data stream from said differences; and
   routing said optimized data stream to a terminal device.

4. The computer implemented method of claim 3 wherein said removing step further comprises the steps of:
   scanning said next state buffer to detect instances of screen attributes;
   determining, with respect to each detected screen attribute, whether such screen attribute is duplicated by an earlier detected screen attribute; and
   deleting said detected screen attribute if said determining step determines that said screen attribute is duplicated by an earlier detected screen attribute.

5. The computer implemented method of claim 4 wherein said forming step further comprises the steps of:
   replacing trailing repeated characters with a Repeat-To-Address order, said trailing repeat characters being of number greater than M; and
   removing all cursor orders within said data stream except a last cursor order.

6. An apparatus for optimizing a data stream, said apparatus comprising:
   means for receiving said data stream into a next state buffer;
   means for comparing said next state buffer to a current state buffer to detect a first difference and a second difference between said next state buffer and said current state buffer;
   means for placing characters from said current state buffer into said outgoing data stream buffer when said first difference is less than N bytes away from said second difference, where N is a non-negative positive integer of value greater than one;
   means for using a Repeat-To-Address order in place of repeated characters within said outgoing data stream buffer whenever there are more than M of said repeated characters, where M is a non-negative positive integer of value greater than one;
   means for placing a Set-Buffer-Address order into said outgoing data stream buffer when said first difference is not a new field and said difference is greater than P bytes away from said second difference, where P is a non-negative positive integer of value greater than one;
   means for outputting data in said outgoing data stream buffer to a terminal device.

7. An apparatus as in claim 6 wherein said means for outputting comprising:
   means for creating an optimized data stream by replacing trailing repeated characters with a Repeat-To-Address order, said trailing repeat characters being of number greater than M;
   means for removing all cursor orders within said optimized data stream except a last cursor order; and means for outputting said optimized data stream to a terminal device.

8. An apparatus for optimizing the commands, orders, and data of a data stream, said apparatus comprising:

means for receiving said data stream into a next state buffer;

means for removing any redundant screen attributes found within said next state buffer;

means for comparing a current state buffer to said next state buffer to discern a first difference and a second difference between said current state buffer and said next state buffer, wherein said means for comparing further comprises:

a) means for placing characters from current state buffer into an outgoing data stream buffer when said first difference is less than N bytes away from said second difference, where N is a non negative positive integer Of value greater than one;

b) means for using a Repeat-To-Address order in place of repeated characters within said outgoing data stream buffer whenever there are more than M of said repeated characters, where M is a non-negative positive integer of value greater than one;

c) means for placing a Set-Buffer-Address order into said outgoing data stream buffer when said difference is not a new field and said difference is greater than P bytes away from a last difference, where P is a non-negative positive integer of value greater than one;

means for forming an optimized data stream from said differences; and means for routing said optimized data stream to a terminal device.

9. The apparatus of claim 8 wherein said means for forming further comprises:

means for replacing trailing repeated characters with a Repeat-to-Address order, said trailing repeat characters being of number greater than M; and means for removing all cursor orders within said data stream except a last cursor order.

10. A computer system for optimizing a data stream, said computer system comprising:

means for receiving said data stream into a next state buffer;

means for comparing said next state buffer to a current state buffer to detect a first difference and a second difference between said next state buffer and said current state buffer;

means for placing characters from said current state buffer into said outgoing data stream buffer when said difference is less than N bytes away from said last difference, where N is a non-negative positive integer of value greater than one;

means for using a Repeat-To-Address order in place of repeated characters within said outgoing data stream buffer whenever there are more than M of said repeated characters, where M is a non-negative positive integer of value greater than one;

means for placing a Set-Buffer-Address order into said outgoing data stream buffer when said first difference is not a new field and said difference is greater than P bytes away from a second difference, where P is a non-negative positive integer of value greater than one; and means for outputting data in said outgoing data stream buffer to a terminal device.

11. An input/output controller for optimizing a data stream, said input/output controller comprising:

means for receiving said data stream into a next state buffer;

means for comparing said next state buffer to a current state buffer to detect a first difference and a second difference between said next state buffer and said current state buffer;

means for placing characters from said current state buffer into said outgoing data stream buffer when said first difference is less than N bytes away from said second difference, where N is a non-negative positive integer of value greater than one;

means for using a Repeat-To-Address order in place of repeated characters within said outgoing data stream buffer whenever there are more than M of said repeated characters, where M is a non-negative positive integer of value greater than one;

means for placing a Set-Buffer-Address order into said outgoing data stream buffer when said difference is not a new field and said first difference is greater than P bytes away from said second difference, where P is a non-negative positive integer of value greater than one; and means for outputting data in said outgoing data stream buffer to a terminal device.

* * * * *